United States Patent [19]

Ritter et al.

[11] Patent Number: 5,102,459

[45] Date of Patent: Apr. 7, 1992

[54] USE OF COLORANTS FOR RECORDING FLUIDS

[75] Inventors: Josef Ritter, Hofheim am Taunus; Alexander Sieber, Frankfurt am Main, both of Fed. Rep. of Germany

[73] Assignee: Hoechst Aktiengesellschaft, Frankfurt am Main, Fed. Rep. of Germany

[21] Appl. No.: 707,415

[22] Filed: May 28, 1991

Related U.S. Application Data

[63] Continuation of Ser. No. 569,777, Aug. 20, 1990, abandoned, which is a continuation of Ser. No. 255,740, Oct. 11, 1988, abandoned.

[30] Foreign Application Priority Data

Oct. 13, 1987 [DE] Fed. Rep. of Germany ....... 3734528

[51] Int. Cl.$^5$ ..................... C09D 11/02; C09B 62/527
[52] U.S. Cl. ........................................ 106/22; 8/681; 8/682; 8/549; 534/642
[58] Field of Search ....................... 106/22; 8/681, 682, 8/549; 534/642

[56] References Cited

U.S. PATENT DOCUMENTS

| | | | |
|---|---|---|---|
| 3,114,754 | 12/1963 | Lodge et al. | 8/682 |
| 3,129,052 | 4/1964 | Dawson et al. | 8/681 |
| 3,135,730 | 6/1964 | Heyna et al. | 534/642 |
| 3,345,122 | 10/1967 | Meininger et al. | 8/682 |
| 3,531,459 | 9/1970 | Chiddix et al. | 8/682 |
| 3,655,642 | 4/1972 | Meininger et al. | 534/642 |
| 4,045,428 | 8/1977 | Meininger et al. | 534/642 |
| 4,046,754 | 9/1977 | Meininger et al. | 534/642 |
| 4,067,549 | 9/1977 | Meininger et al. | 534/642 |
| 4,072,463 | 2/1978 | Schlafer et al. | 8/549 |
| 4,257,770 | 3/1981 | Nishimura et al. | 8/681 |
| 4,568,350 | 2/1986 | Rohrer | 8/682 |
| 4,581,036 | 4/1986 | Opitz et al. | 8/549 |
| 4,585,459 | 4/1986 | Opitz et al. | 8/549 |
| 4,711,668 | 12/1987 | Shimoda et al. | 106/22 |
| 4,762,524 | 8/1988 | Chambers et al. | 8/549 |
| 4,769,446 | 9/1988 | Corso et al. | 8/549 |
| 4,824,942 | 4/1989 | Yokogawa et al. | 534/642 |

FOREIGN PATENT DOCUMENTS

| | | | |
|---|---|---|---|
| 0124797 | 11/1984 | European Pat. Off. | 534/642 |
| 0158233 | 10/1985 | European Pat. Off. | |
| 0202656 | 11/1986 | European Pat. Off. | |
| 0210492 | 2/1987 | European Pat. Off. | 534/642 |
| 0238894 | 9/1987 | European Pat. Off. | 534/642 |
| 1943904 | 3/1971 | Fed. Rep. of Germany | |
| 3320373 | 8/1983 | Fed. Rep. of Germany | |
| 3539727 | 5/1986 | Fed. Rep. of Germany | |
| 3613009 | 10/1986 | Fed. Rep. of Germany | |
| 3614462 | 10/1986 | Fed. Rep. of Germany | |
| 2123019 | 1/1984 | United Kingdom | |
| 2168368 | 6/1986 | United Kingdom | |
| 2184742 | 7/1987 | United Kingdom | |

OTHER PUBLICATIONS

Patent Abstracts of Japan, vol. 9, No. 301=JP 60-139766 (Jul. 24, 1985).

*Primary Examiner*—William R. Dixon, Jr.
*Assistant Examiner*—Helene Klemanski

[57] ABSTRACT

The invention relates to a method using water-soluble dyestuffs for coloring recording fluids, particularly in the ink jet process, wherein the dyestuffs in the form of the free acid have the general formula $A-(SO_2-X)_p$.

The dyestuffs (I) can be prepared analogously to methods for preparing known vinylsulfone or β-sulfatoethylsulfone dyestuffs which are further reacted with nucleophiles $R^1OH$, $HNR^1R^2$, $HSR^1$ etc. Some of the reaction products are novel dyestuffs.

13 Claims, No Drawings

USE OF COLORANTS FOR RECORDING FLUIDS

This application is a continuation of application Ser. No. 07/569,777, filed Aug. 20, 1990, now abandoned, which is a continuation of application Ser. No. 255,740, filed Oct. 11, 1988, now abandoned.

DESCRIPTION

The invention relates to the technical field of colorants for use in recording fluids for writing and recording instruments. In particular, the invention relates to aqueous inks for the ink jet process.

The ink jet process is understood to mean a recording system in which individual ink droplets are sprayed in a controlled fashion from a narrow nozzle onto a recording material, for example paper. In this process, the sprayed-on ink droplets remain adhered to the recording material and thus form the desired information. In practice, various methods for producing and controlling the ink droplets are used today. Thus, for example, the production of the jet of droplets can take place continuously, the ink jet being deflected into a receptacle, when no writing takes place, and the ink being recycled. In a different embodiment of the process, each droplet produced hits the recording material; however, droplets are only produced if actual writing takes place (drop on demand process). The production of the droplets can be effected by an increase in pressure for a short time in an ink chamber which is equipped with a narrow nozzle, for example by means of a piezo oscillator. Those systems in which the energy for spraying droplets is supplied in the form of thermal energy of the ink are also known.

Irrespective of which process is used in a certain ink jet recording system, a number of requirements must be met by the ink to be used. Thus, the ink composition must have carefully balanced physical properties such as viscosity, surface tension and electrical conductivity to make it suitable for the production of droplets and the control of the flight direction of the droplets. Another important aspect is that under no circumstances may any kind of solid form in the ink, even if a component of the recording fluid evaporates or the chemical composition of the ink changes during a long period of storage during the recording or during a break in recording.

Furthermore, the image once recorded should have fairly high water-resistance, light-resistance and resistance to wear. However, the prior art inks, in particular the aqueous inks, have the disadvantage of smearing easily over the recording material, when they are moistened. A further disadvantage is that the known inks frequently fade quickly by the effect of light or mechanical wear.

In the case of ink compositions for multi-color printing, a further difficulty arises, namely that the dyes on which the inks are based must exactly correspond to the three primary colors, yellow, cyan and magenta. The selection of suitable dyes is limited not only by the hue required but also by the purity of the color required and the desired brilliance of the color reproduction. Many attempts have been made to optimize inks with respect to the properties mentioned. However, to date, it has not been possible to find such an ink composition which possesses all the desired properties in an ideal fashion and can be used in practice.

The state of affairs will be illustrated in more detail using the example of inks of the hue magenta. In conventional aqueous magenta inks, for example, direct dyes such as C.I. Direct Red 1, 11, 37, 62, 75, 81, 87, 89, 95 and 227 are used. Jet printing inks produced from direct dyes have very good water-resistance due to the substantivity of the direct dyes. They have, in particular, two disadvantages: because of the low solubility of direct dyes in water, the nozzles are easily clogged by precipitated dye during the continuous printing or in the case of intermittent hues; frequently only unsatisfactory color reproductions are possible with direct dyes due to the dull shades caused by aggregation. On the other hand, it has also been suggested to use acid dyes, for example .I. Acid Red 1, 8, 52, 87, 94, 115, 131, 144, 152, 154, 186 and 245. Inks produced with acid dyes allow very good color reproduction. However, the stability of the images printed therewith is insufficient due to the low light- and water-resistance.

DE-A-3,614,462 and DE-A-3,320,373 disclose recording fluids for the ink jet recording process, which fluids can also contain reactive dyes. However, water-soluble reactive dyes of the chlorotriazinyl or $\beta$-sulfatoethylsulfonyl type generally do not yet have optimal water-resistance in the prints produced therewith on paper, the formation of sulfate ions or chloride ions by hydrolysis on the reactive groups having an additional adverse effect.

It is known from EP-A-0,202,656 to use liquid dye formulations for jet ink printing processes, which formulations contain reactive dyes of the disperse dye type. The reactive disperse dyes have to be dispersed in an aqueous medium and require the use of auxiliaries adapted to the individual dye to avoid its flocculation in the liquid formulation. The dyes are preferably used for textile printing and are fixed on the textiles under alkaline conditions. Due to the low water-solubility of these reactive dyes, they are practically unsuitable for use in recording processes having a relatively high resolution, such as, for example, in the drop on demand process. In addition, these known dye formulations are not very suitable for paper printing because of the high content of auxiliaries.

There is therefore a demand for improved recording fluids containing colorants which can be used in the ink jet process. The invention relates to the use of water-soluble dyes for the dyeing of recording fluids, wherein the dyes in the form of the free acid have the general formula (I)

$$A-(SO_2-X)_p \qquad (I)$$

in which A stands for a conventional coloring radical carrying at least one sulfo group from the class consisting of monoazo or disazo dyes or complexes thereof with chromium, iron, cobalt or copper, the copper or nickel phthalocyanines, anthraquinones, dioxazines or copper formazan complexes, p stands for 1, 2, 3 or 4 and X stands for a vinyl group or for a radical of the formulae (IIa)–(IIe)

$$-CH_2CH_2OR^1 \qquad (IIa)$$

$$-CH_2CH_2NR^1R^2 \qquad (IIb)$$

$$-CH_2CH_2SR^1 \qquad (IIc)$$

$$-CH_2CH_2NR^1NR^2R^3 \qquad (IId)$$

and —CH$_2$CH$_2$— 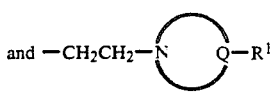 (IIe)

in which R$^1$ and R$^2$ and R$^3$ independently of one another denote a hydrogen atom, a radical of the formula —CH$_2$CH$_2$—SO$_2$—A, in which A has the meaning mentioned in formula (I), or denotes a substituted or unsubstituted alkyl, cycloalkyl, aralkyl or aryl radical or a substituted or unsubstituted radical of an aliphatic or aromatic heterocyclic system and Q together with a nitrogen atom denotes a substituted or unsubstituted aliphatic or aromatic heterocyclic system, in which the radicals R$^1$, R$^2$ and R$^3$ and the heterocycle consisting of N and Q are, in particular, not further substituted or are substituted by one or more radicals from the group consisting of alkyl, alkoxy, aryl, hydroxyl, primary, secondary and tertiary amino, nitro, sulfo, carboxyl, alkyloxycarbonyl, aminocarbonyl, alkylaminocarbonyl, alkanoylamino and halogen.

Of the abovementioned dyes, those are particularly suitable in which R$^1$, R$^2$ and R$^3$ independently of one another denote hydrogen, alkyl having 1 to 22 carbon atoms, cycloalkyl having 5 or 6 ring atoms, alkylphenyl having 1 to 22 carbon atoms in the alkyl radical, phenyl, naphthyl, a heterocyclic system having 5 or 6 ring atoms or consisting of two fused-on 5- or 6-membered rings, at least one of which contains a heteroatom, and Q together with a nitrogen atom denotes an aliphatic heterocyclic system, it being possible for R$^1$, R$^2$ and R$^3$ and the heterocycle consisting of N and Q being substituted by 1 to 3 radicals, preferably one radical, from the group consisting of C$_1$-C$_{22}$-alkyl, C$_1$-C$_{22}$-alkoxy, phenyl, tolyl, hydroxyl, amino, alkylamino and dialkylamino having 1 to carbon atoms in the alkyl radical, sulfo, carboxyl, fluorine, chlorine and bromine.

Furthermore, those dyes of the formula (I) are preferably used in which X stands for the radical of the formula (IIf)

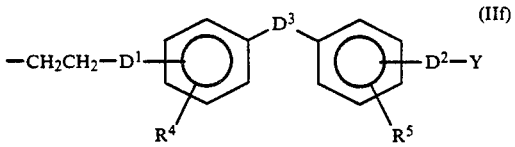 (IIf)

in which D$^1$ and D$^2$ independently of one another denote an oxygen atom or a secondary or tertiary amino group, D$^3$ is a direct bond, a secondary or tertiary amino group, straight-chain or branched saturated or unsaturated alkylene, a group of the formula —O—, —S—, —SO—, —SO$_2$— or —CO—, R$^4$ and R$^5$ independently of one another denote C$_1$-C$_{18}$-alkyl, in particular C$_1$-C$_4$-alkyl, C$_1$-C$_{18}$-alkoxy, in particular C$_1$-C$_4$-alkoxy, carboxyl, sulfo or halogen and Y denotes hydrogen or the radical —CH$_2$CH$_2$—SO$_2$—A, in which A has the meaning mentioned in formula (I).

Of the dyes in which X denotes the radical of the formula (IIf), in particular those are suitable in which D$^1$ and D$^2$ have the same meaning and in each case denote a group of the formula —O—, —NH— or —NR—, in which R stands for C$_1$-C$_4$-alkyl, and D$^3$ denotes a direct bond or a group of the formula —O—, —S—, —NH—, —NR—, in which R stands for C$_1$-C$_4$-alkyl, —SO—, —SO$_2$— or —CO— or straight-chain or branched C$_1$-C$_8$-alkylene, such as, in particular, —CH$_2$—, —CH$_2$C$_2$—, —(CH$_2$)$_3$—, —CH(CH$_3$)— and —C(CH$_3$)$_2$— or denotes —CH=CH— and R$^4$ and R$^5$ have the same meaning and denote C$_1$-C$_4$-alkyl, C$_1$-C$_4$-alkoxy, carboxyl, sulfo or chloro and Y denotes hydrogen or the radical —CH$_2$CH$_2$—SO$_2$—A, in which A has the meaning mentioned in formula (I).

Furthermore, those dyes of the formula (I) are of interest in which X stands for the radical of the formula (IIg)

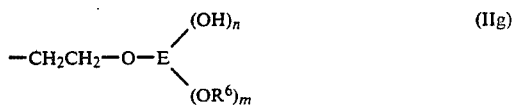 (IIg)

in which E is a straight-chain, branched or cyclic hydrocarbon radical having heteroatoms or no heteroatoms and being further not substituted or further substituted, R$^6$ is hydrogen or the radical of the formula —CH$_2$CH$_2$—SO$_2$—A, in which A has the meaning mentioned in formula (I), and n and m are each whole numbers from 0 to 12 having a total number of 2 to 12.

Of the dyes having the radical of the formula (IIg), those are preferably used in which X stands for the radical of the formula (IIh)

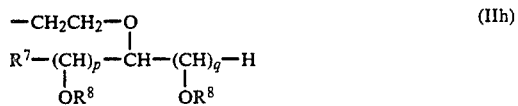 (IIh)

in which R$^7$ is hydrogen or hydroxyl, preferably hydrogen, the R$^8$ radicals independently of one another are hydrogen or the radical of the formula —CH$_2$CH$_2$—SO$_2$—A, in which A has the meaning mentioned in formula (I), and p and q are each whole numbers of 0 to 4 having a total number of 1 to 5.

Of the dyes having the radical of the formula (IIh), those are preferably used in which R$^7$ and R$^8$ in formula (IIh) denote hydrogen.

The dyes of the formula (I) can be prepared in a manner known per se analogously to known reactive dyes of the vinylsulfone or β-sulfatoethylsulfone series, the —SO$_2$X groups usually being introduced in the following manner: sulfochlorination of the dye or a dye precursor, followed by reduction of the aromatic sulfochloride, for example with sodium sulfite, to sulfinic acid and reaction with a suitable electrophilic alkyl compound. In the case of known reactive dyes, the aromatic sulfochloride is in most cases alkylated with ethylene oxide and the resulting 2-hydroxyethylsulfone is esterified, for example with sulfuric acid, phosphoric acid or hydrochloric acid. Using sulfuric acid, for example, a β-sulfatoethylsulfone reactive dye is obtained directly or, if the introduction of the reactive group is carried out with the dye precursor—after synthesis of the dye molecule. The reactive dye obtained can be used for the preparation of recording fluids. A large number of B-sulfatoethylsulfone reactive dyes, their analogs and derivatives such as vinylsulfone reactive dyes are commercially available. Suitable reactive dyes which serve as starting materials for dyes of the formula (I) are, for example, C.I. Reactive Yellow 13, 14, 15, 16, 17, 37, 42, 57, 72, 73, 88, 89, 90, 91, 92, 93, 99, 100, 114, 115, 116 and 117, in particular 37 and 57, C.I. Reactive Orange 7, 55, 72 and 74, C.I. Reactive Red 21, 22, 23, 35, 63, 106, 107, 112, 113, 114, 126, 127, 128, 129, 130, 131, 137, 160, 161, 174 and in particular 180, C.I. Reactive Violet 4, 5 and 25, C.I. Reactive Blue 19, 20, 21, 77, 117, 118, 119, 143, 144, 147, 148 and 202, in particular 21, and also C.I. Reactive Black 5, 31 and 38.

As for the dyes of the formula (I) in which X denotes a radical of the formula (IIa)–(IIh), these can be preferably prepared from the reactive dyes mentioned.

One possible method of preparation consists in reacting the dye of the formula (I) in which X denotes a vinyl group with oxygen, nitrogen or sulfur nucleophiles under the conditions of a Michael addition. A different possibility starts from the dye of the formula (I) in which X denotes 2-sulfatoethyl, in which case the reaction with oxygen, nitrogen or sulfur nucleophiles generally takes place after the addition of suitable bases.

Suitable nucleophiles for the two last-mentioned variations for the preparation of dyes in which X corresponds to one of formulae (IIa)–(IIc) are for example: $NH_3$ and $H_2O$ and also alcohols, alkylamines, dialkylamines and thiols having a saturated or unsaturated alkyl radical having 1 to 22 carbon atoms or having a $C_5$–$C_{10}$-cycloalkyl radical, for example methyl, ethyl, propyl, isopropyl, 1-butyl, 2-butyl, 2-methyl-2-propyl, pentyl, neopentyl, hexyl, heptyl, octyl, nonyl, decyl, undecyl, dodecyl, tetradecyl, pentadecyl, hexadecyl, heptadecyl, octadecyl, nonadecyl, icosyl, henicosyl, docosyl, tricosyl, tetracosyl, 2-methylpentyl, 2-ethylhexyl, 2-propyl-heptyl, 2-butyloctyl, 2-pentylnonyl, 2-hexyldecyl, 2-heptylundecyl, 2-octyldodecyl, 2-nonyltridecyl, 10-undecenyl, 9c-octadecenyl, 9t-octadecenyl, 9c,12c-octadecadienyl, 9c,12c,15c-octadecatrienyl, 9c-icosenyl, 5,8,11,14-icosatetraenyl, 13c-docosenyl, 13t-docosenyl, cyclopentyl, cyclohexyl, tetrahydronaphthyl and decahydronaphthyl, preferably alcohols and amines such as methanol, ethanol, propanol, isopropanol, butanol, isobutanol, hexanol, octanol, decanol, dodecanol, tetradecanol, hexadecanol, octadecanol, methylamine, dimethylamine, ethylamine, diethylamine, propylamine, butylamine, hexylamine, octylamine, decylamine, dodecylamin, tetradecylamine, hexadecylamine and octadecylamine.

Suitable nucleophiles are also the abovementioned alcohols and amines which are further substituted in the alkyl radical, such as glycols, polyglycols, glycol monoalkyl ethers, hydroxyalkylamines, alkoxyalkylamines, alkylenediamines, alkylaminoalkylamines, hydroxyalkylsulfonic acids, hydroxycarboxylic acids, hydroxycarboxylic esters, hydroxycarbonamides, amino acids, esters and amides of amino acids, arylalkanols and arylalkylamines, in particular ethylene glycol, propylene glycol, 2-methoxyethanol, 2-methoxypropanol, 2-ethoxyethanol, 2-ethoxypropanol, diethylene glycol, diethylene glycol monomethyl ether, diethylene glycol monoethyl ether, ethylenediamine, 1,3-diaminopropane, 1,4-diaminobutane, 3-ethylaminopropylamine, tallow fatty propylenediamine, taurine, hydroxyethylsulfonic acid, benzyl alcohol, benzylamine, phenylethylamine, tryptamine and hydrins such as ethylene chlorohydrin.

Suitable nucleophiles are also substituted or unsubstituted aromatic amines and aliphatic or aromatic heterocyclic amines or the corresponding thio or hydroxy compounds, in particular phenol, alkylphenols such as cresols, hexylphenol, nonylphenol and dodecylphenol, hydroxybe-nzoic acid, hydroquinone, resorcinol, catechol, aminobenzene, toluidine, 1,2-, 1,3- and 1,4-diaminobzene, 1-naphthol, 2-naphthol, naphtholsulfonic acids, sulfanilic acid, chlorophenol, dichlorophenols, naphthylamine, alkylnaphthols, o-, m- and p-methoxyphenol and -ethoxyphenol, o-, m- and p-nitroaniline, and also heterocyclic amines such as 1-aminopiperidine, melamine, 2-aminobenzothiazole, 5-aminobenzimidazol-2-one, 2-mercaptobenzimidazol and 2-mercaptobenzothiazole.

Suitable amines for the preparation of the dyes having a radical of the formula (IId) are hydrazine and hydrazines, for example monoalkylhydrazines such as methylhydrazine, ethylhydrazine, propylhydrazine and butylhydrazine, phenylhydrazine and dialkylhydrazines such as N,N-dimethylhydrazine and N,N'-dimethylhydrazine. Suitable amines for the preparation of the dyes having a radical of the formula (IIe) are, for example, pyrrolidine, piperidine, piperazine and morpholine.

Suitable examples for the preparation of the dyes according the invention having a radical of the formula (IIf) are, for example, bis(4-hydroxyphenyl)methane, 2,2-bis(4-hydroxyphenyl)propane, bis(2-hydroxyphenyl)methane, bis(4-hydroxyphenyl) sulfide, bis(4-hydroxyphenyl) sulfone, 4,4'-dihydroxybenzophenone, 4,4'-dihydroxybiphenyl and 2,2'-dihydroxybiphenyl.

Suitable examples for the preparation of the dyes according to the invention having a radical of the formula (IIg) are glycerol, pentaerythritol, erythritol, arabitol, adonitol, xylitol, sorbitol, mannitol, dulcitol, monosaccharides such as glucose and fructose, disaccharides such as sucrose and maltose, and trisaccharides such as raffinose.

Of the dyes of the formula (I) mentioned so far, of particular interest are those which in the form of the free acid have the formula (Ia),

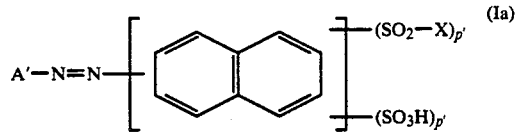

in which A' represents the radical of an azo component of the benzene, naphthalene, N-arylacetoacetamide, pyrazolone or quinoline series, X has the meaning given in formula (I), p' is 1 or 2, preferably 1, and q' is 1 or 2, and the sum (p'+q') is no more than 3.

Of these, those magenta azo dyes are particularly preferred which in the form of the free acid have the formula (Ib)

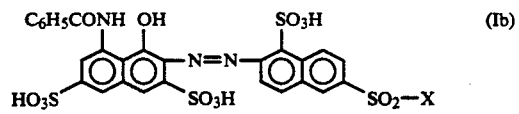

in which X has the meaning given in formula (I).

Specifically the azo dyes of the formula (Ia) mentioned can be prepared analogously to the reactive dyes from German Patent No. 1,943,904, according to which the dyes in which X denotes a radical of the formulae (IIa) to (IIh) are obtained by diazotization of suitable naphthylamines of the formula (III)—or salts thereof—

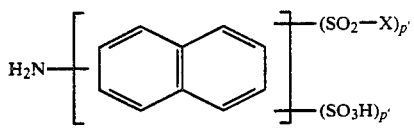  (III)

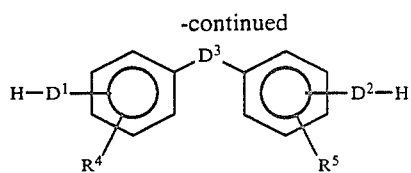

in which X, p' and q' have the meaning given in formula (Ia), and coupling onto the coupling components mentioned in this publication or are obtained from the vinylsulfone or β-sulfatoethylsulfone reactive dyes described in this publication by derivatization analogously to the procedures described above by reaction with nucleophiles. As for the azo dyes of the formula (Ib) mentioned, they can be prepared in a manner known per se by diazotization of suitable aromatic naphthylamines of the abovementioned formula (III) and coupling onto 1-benzoylamino-8-naphthol-3,6-disulfonic acid (N-benzoyl H acid) analogously to the processes from German Patent No. 1,943,904. The azo dyes of the formula (Ib), in which X denotes a radical of the formula (IIa) to (IIh) are preferably named from the corresponding compounds in which X denotes vinyl or 2-sulfatoethyl analogously to the procedures described above by reaction with nucleophiles of the formulae $R^1OH$, $HNR^1R^2$, $HSR^1$, $NHR^1NR^2R^3$,

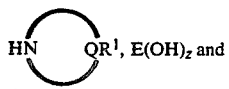

$R^1$, $R^2$, $R^3$, $R^4$, $R^5$ and $D^1$, $D^2$ and $D^3$ having the abovementioned meaning and z being a whole number of 1 to 13.

With respect to the multi-color printing using the ink jet process, for example, those compounds can also preferably be used which in the form of the free acid have the formulae (Ic) to (If)

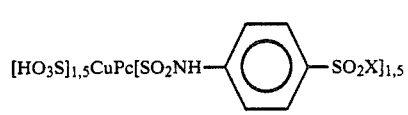  (Ic)

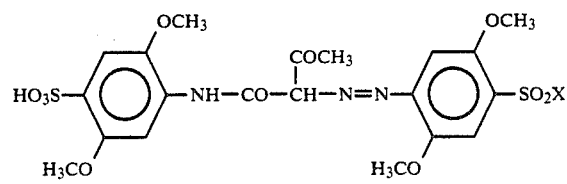  (Id)

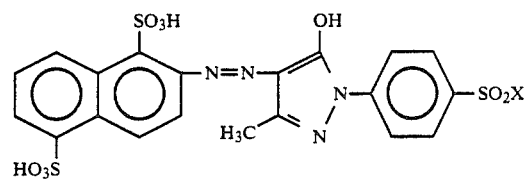  (Ie)

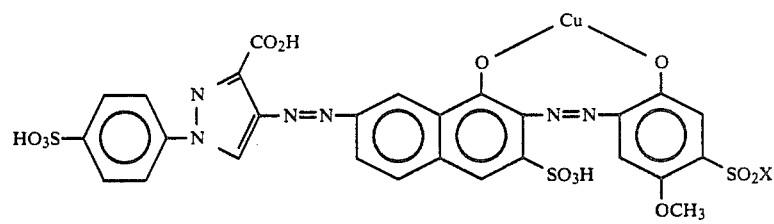  (If)

in which X has the meaning given in formula (I) and CuPc denotes the radical of a copper phthalocyanine.

The dyes of the formulae (Ic) to (If) are preferably prepared analogously to the processes described in formula (Ib) from the corresponding dyes in which X denotes the 2-sulfatoethyl group.

It is particularly advantageous, if the preparation of the dyes according to the invention are prepared from the dyes of the formula (I) in which X in a vinyl or 2-sulfatoethyl group. The reason is that in this case the reaction with the oxygen, nitrogen or sulfur nucleophiles can be carried out together with the preparation of the recording fluids. Recording fluids and, in particular, inks for the ink jet process are usually adjusted to a weakly alkaline pH and, in addition, frequently subjected to a treatment, which in some cases is fairly long-lasting, at elevated temperature and subsequently purified using a suitable filtration method, such as has been described, for example, in DE-A-3,613,009.

Under these conditions, the dyes of the formula (I) react smoothly with a large number of alcohols, phenols, amines or thiols. The course of this reaction can be monitored by a suitable analytical method such as, for example, thin layer or high-pressure liquid chromatography. To accelerate the reaction, the reaction temperature can be increased, if necessary, up to 150° C. at pressures of up to 6 bar. Preferably, at atmospheric pressure, reaction temperatures between 0° and 100° C., in particular of 20° to 70° C. are used.

The pH of the reaction solution can be the same as the pH of the ready-to-use recording fluid and should advantageously have values between 6 and 13. Preference is given to pH values between 8 and 12 and, in particular, preference is given to those between 9 and 11.

If the ink to be produced contains a mixture of various solvents, the reaction can be carried out in this solvent mixture or, alternatively, before the solvent components are mixed in only one component of the solvent mixture.

The concentration of the dyes of the general formula (I) can correspond to the desired dye concentration in the ink even during the reaction with nitrogen, oxygen or sulfur nucleophiles or can be larger, the upper limit of the concentration being limited by the solubility of the dyes in the reaction medium. As a rule, dye concentrations of 0.1% to 30% can be used. Preference is given to those of 0.5 to 20%, in particular of 1 to 10%.

The process according to the invention for the preparation of recording fluids can be conducted in a very flexible manner and be adapted in a simple manner to the particular requirements, for example to apparatuses in the laboratory and production.

During the preparation of the recording fluid, it is therefore possible, in a simple manner, to obtain one or more dyes of the general formula (I), starting from the dyes of the formula (I) in which X stands for —CH=CH$_2$ or —CH$_2$CH$_2$OSO$_3$H by adding suitable alcohols, phenols, amines or thiols. By appropriate selection of the alcohols, phenols, amines and thiols, or mixtures thereof, the recording fluids and, in particular, the dyes contained therein can be adjusted to a large extent to the individual requirements of a certain type of recording instrument or of a certain recording material.

The dyes of the formula (I) according to the invention are highly water-soluble, but they are also distinguished by very high solubilities in various organic solvents such as glycols, in particular diethylene glycol, dimethyl sulfoxide or N-methyl-2-pyrrolidone (NMP). Therefore they can be used not only in purely aqueous recording fluids but also in those which contain miscible organic solvent, and also in non-aqueous recording fluids.

As a rule, the liquid mediums which are used in ink jet recording fluids are those which consist predominantly of water. In general, slightly volatile water-soluble organic solvents such as glycol are additionally used as humectants. The solubility of dyes in these liquid media is very sensitive to changes in the chemical structure of the dyes, the solubilities of the dyes in water, on the one hand, and in glycol, on the other, frequently being opposite to one another. At the tip of the nozzle, water as the more volatile component tends to evaporate preferentially, thus creating a high glycol concentration If the recording fluid contains a dye which is not very soluble in glycol, there is the danger that the nozzle becomes clogged by precipitation of the dye. Thus, many of the abovementioned acid dyes, for example, are quite soluble in water, but have lower solubility in glycol. Therefore, recording fluids containing these acid dyes frequently lead to clogging of the nozzle. In contrast, the dyes of the formula (I) to be used according to the invention have good solubility in glycol and other organic solvents, the solubility in water being in a range suitable for practical purposes. Therefore, cloggings of the ink jet nozzles are largely prevented.

The proportion of the dyes to be used according to the invention in the recording fluids is determined depending on the type of the components of the liquid medium, the required properties of the recording fluids and the like.

Advantageously, this proportion is 0.1–20, preferably 0.5–15 and, in particular, 1–10% by weight of dye, relative to the total weight of the recording fluid.

The dyes according to the invention can be used by themselves or as a combination of two or more such dyes. The dyes can even be used together with one or more other dyes such as direct dyes, acid dyes, reactive dyes and the like.

Preferably, the solids content in the recording fluid consists of 50 to 100% by weight, in particular 90 to 100% by weight, of the dye of the formula (I).

The dyes of the general formula (I) can be used for the preparation of recording fluids in powder or granule form, as a presscake or as a solution. Preferably, the dyes of the formula (I) are used in low-salt form, such as is available, for example, by freezing the sodium sulfate out of an aqueous salt-containing solution of the dyes by the process of EP-A-0,158,233.

Particular preference is given to a form containing less than 2% by weight of sulfate ions and less than 0.5% by weight of chloride ions and which can be obtained, for example, by dissolution/precipitation operations, ion exchange or by membrane separation processes (see DE-A-3,539,727).

Recording fluids for obtaining one or more of the dyes of the general formula (I) are highly suitable for printing, duplicating, marking, writing, drawing, stamping or registering processes. It is particularly advantageous to use the recording fluids containing the dyes mentioned in those apparatuses which operate by the ink jet process. The inks for the ink jet printing according to the invention are distinguished by a low tendency to clog the nozzles. Upon storage of the inks according to the invention, no or only a slight formation of precipitates occurs. Even if the inks are used for a longer period of time with constant recycling or intermittently, switching the jet ink printer off temporarily, at most only a slight change in the physical properties of the inks according to the invention can be detected. Using the inks according to the invention gives printed images of high quality, which have excellent color reproduction, high brilliance and very good water- and light-resistance.

Aqueous inks which have been prepared using the dyes of the formula (I) have a pure and brilliant color and are distinguished by excellent color reproduction and light fastness. The light fastness far exceeds that of inks having acid dyes of a similar color, such as, for example, C.I. Acid Red 52 in the case of the magenta colorants.

Compared to aqueous inks having acid dyes, the inks according to the invention having dyes of the formula (I) in which X is a vinyl or 2-sulfatoethyl group are distinguished by a significantly higher water-resistance on paper.

Below, the invention is illustrated in more detail by means of examples. The parts given are parts by weight.

Preparation of dyes and inks 1) 94 parts of a salt-containing dye of the formula (Ib), in which X stands for —CH$_2$CH$_2$—O—SO$_3$H and which has a dye content of 45%, are dissolved in 250 parts of water. This solution is added at room temperature with stirring to 60 parts of a two-molar sodium carbonate solution, the pH of the mixture being maintained at 9, if necessary, by the addition of further sodium carbonate solution. The resulting dye, in which X denotes a vinyl group, is then salted out with 200 parts of sodium chloride, filtered off with suction and washed with saturated sodium chloride solution. After drying, 43 parts of a powder having a dye content of 73% are obtained.

2) 94 parts of a salt-containing dye of the formula (Ib), in which X stands for —CH$_2$CH$_2$—O—SO$_3$H and which has a dye content of 45%, are dissolved in 250 parts of water. This solution is added dropwise at room temperature with vigorous stirring to a mixture of 100 parts of water and 5 parts of aniline, the pH being maintained at 9 with a two-molar sodium carbonate solution. After the dye has been salted out with 170 parts of sodium chloride, it is filtered off with suction and washed with saturated sodium chloride solution. After drying, 53 parts of a salt-containing dye powder having a dye content of 78% are obtained.

The dye obtained in the form of the free acid has the formula (Ib), in which X denotes the radical 2(phenylamino)ethyl. Thus, the reaction resulted in the replacement of the sulfato group of the 2-sulfatoethyl group by the nucleophilic amino group of aniline.

3) Using nucleophiles of the formula Nuc-H instead of aniline gives dyes of the formula (Ib) analogously to Example 2), in which X denotes the substituted ethyl radicals of the formula Nuc—CH$_2$CH$_2$— listed in Table 1.

TABLE 1

| Example | X |
|---|---|
| 3a | CH$_3$CH$_2$CH$_2$CH$_2$NHCH$_2$CH$_2$— |
| 3b | HO$_3$SCH$_2$CH$_2$NHCH$_2$CH$_2$— |
| 3c | CH$_3$(CH$_2$)$_{15}$NHCH$_2$CH$_2$— |
| 3d | CH$_3$(CH$_2$)$_{15}$NHCH$_2$CH$_2$CH$_2$NHCH$_2$CH$_2$— |
| 3e | ![2,2,6,6-tetramethylpiperidin-4-yl amino ethyl] |
| 3f | ![piperidin-1-yl amino ethyl] |
| 3g | 2-(Benzothiazol-2-ylamino)-ethyl |
| 3h | 2-(2-Oxo-benzimidazol-5-ylamino)-ethyl |
| 3i | H$_2$NCH$_2$CH$_2$— |
| 3j | H$_2$NCH$_2$CH$_2$NHCH$_2$CH$_2$— |
| 3k | H$_2$NCH$_2$CH$_2$CH$_2$NHCH$_2$CH$_2$— |
| 3l | H$_2$NCH$_2$CH$_2$CH$_2$CH$_2$NHCH$_2$CH$_2$— |
| 3m | H$_2$NNHCH$_2$CH$_2$— |
| 3n | HOCH$_2$CH$_2$NHCH$_2$CH$_2$— |
| 3o | (HOCH$_2$CH$_2$)$_2$NCH$_2$CH$_2$— |
| 3p | R—NH—CH$_2$CH$_2$CH$_2$—NH—CH$_2$CH$_2$— where R is fatty alkyl (65% of C$_{18}$, 30% of C$_{16}$ and 5% of C$_{14}$) |

4) 94 parts of salt-containing dye of the formula (Ib), in which X stands for —CH$_2$CH$_2$—OSO$_3$H and which has a dye content of 45%, are dissolved in 300 parts of water. 4 parts of ethylene glycol monomethyl ether are added, and the mixture is adjusted to a pH of 11 with 2-normal sodium hydroxide solution. The mixture is stirred at this pH for 12 hours at room temperature. The resulting dye is salted out with 250 parts of sodium chloride, filtered off with suction, washed with saturated sodium chloride solution and dried at 80° C. in vacuo. This gives 55 parts of a salt-containing dye having a dye content of 63%. The structure of the dye corresponds to the formula (Ib), in which X denotes the formula

CH$_3$OCH$_2$CH$_2$OCH$_2$CH$_2$—

5) Using other oxygen nucleophiles instead of ethylene glycol monomethyl ether, dyes of the formula (Ib), in which X denotes the radicals listed in Table 2 below, are obtained analogously to Example 4.

TABLE 2

| Example | X |
|---|---|
| 5a | 2-Ethoxyethyl |
| 5b | 2-Propoxyethyl |
| 5c | 2-(2-Butoxyethoxy)-ethyl |
| 5d | 2-Phenoxyethyl |
| 5e | 2-Naphthoxyethyl |
| 5f | 2-Benzoxyethyl |
| 5g |  |
| 5h | 2-(4-Hydroxyphenoxy)-ethyl |
| 5i | 2-(3-Hydroxyphenoxy)-ethyl |
| 5j | 2-(2-Hydroxyethoxy)-ethyl |
| 5k | 2-(3-Hydroxypropoxy)-ethyl |
| 5l | 2-(2,3-Dihydroxypropoxy)-ethyl |
| 5m | HOCH$_2$(CHOH)$_4$CH$_2$OCH$_2$CH$_2$— |

6) 4.5 parts of the dye of the formula (Ib), in which X stands for vinyl, are dissolved together with 0.2 part of potassium carbonate and 3.0 parts of 2-aminoethanol in 500 parts of ethylene glycol and 42.8 parts of water. The ink has a pH of 10.8. After 4 hours at room temperature, virtually only one product can be detected by thin-layer chromatography, the structure of which corresponds to the product from Example 3n.

7) 4.5 parts of the dye of the formula (Ib), in which X stands for —CH$_2$CH$_2$OSO$_3$H, are dissolved together with 0.2 part of lithium hydroxide and 3.0 parts of taurine in 50 parts of propylene diglycol and 42.3 parts of water. After a short period of time, analysis of this recording fluid by thin-layer chromatography shows exclusively the product from Example 3b.

8) 4.0 parts of the dye of the formula (Ib), in which X stands for vinyl, are dissolved together with 3.0 parts of 5-aminobenzimidazol-2-one in 20 parts of propylene glycol, 5 parts of dimethylformamide and 68 parts of water. The ink has a pH of 6.6 after 48 hours at room temperature, the starting dye has been converted according to analysis by thin-layer chromatography The ink now contains a mixture of the dyes of the formula (Ib), in which X partially denotes —CH$_2$CH$_2$OH and partially 2-[5-(2-oxobenzimidazolyl)amino]ethyl.

9) Determination of the water-resistance: Inks are prepared from 4 parts of the particular dye listed in Table 3 below and 96 parts of water, and a sheet of paper (No. 2312 from Schleicher and Schüll) is dipinked.

The paper is allowed to dry at room temperature for a day, and the color strength $F_o$ of the ink with which the paper had been impregnated is then determined using a spectrophotometer from Pacific Scientific. The sample is then cut into two parts, which are dipped separately into water of 23° C. One half is removed from the bath after 15 seconds and the other after 30 seconds. After drying, the remaining color strength $F_{15}$ and $F_{30}$ is measured.

The water-resistance W is expressed as a ratio of the color strength $F_{15}$ or $F_{30}$ to the color strength $F_o$ in percent.

The results are summarized in Table 3, which for comparison also contains the results on water-resistance of a commercially available acid dye and a reactive dye.

TABLE 3

| Dye | $W_{15}$ | $W_{30}$ |
| --- | --- | --- |
| 3 l | 80% | 71% |
| 3 p | 78% | 71% |
| 3 g | 70% | 69% |
| Formula (Ib) where x is 2-sulfatoethyl | 66% | 58% |
| C.I. Acid Red 52 | 38% | 30% |

It can be seen from the table that the dyes to be used according to the invention have a significantly improved water-resistance compared to the acid dye and the reactive dye. Similarly good water-resistances are also shown by the remaining compounds from Examples 1 to 8.

10) To carry out printing experiments by the ink jet process, three recording fluids are prepared from the following components:
20 parts of diethylene glycol
79 parts of deionized water
1 part of ®Luviskol K 30 (polyvinylpyrrolidone) 4 parts of the dye from Example 3c, 3o or 4, the dye being desalted in each case by membrane filtration (chloride ion content<0.1%, sulfate ion content<2%)

The ink obtained in each case is filtered through a 0.4 μm membrane filter from Sartorius company and used in a XEROX printer 4020, which operates by the drop-on-demand process. The printout uses original Xerox paper.

The recording fluids used show good deposition stability not only in continuous but also in intermittent recording at surrounding temperatures of 15° to 30° C. over a period of 96 hours.

Investigation of the long-term storage stability during one year of storage at an average room temperature of 21° C. shows no precipitations or color changes of the recording material. The prints obtained have a brilliant magenta and are highly suitable for use as primary colors for subtractive color mixing. In addition, their light fastness is such that after 100 hours of exposure using a Xenon fadeometer they are still very legible. The water-resistance of the prints is excellent.

11) 1250 parts of a 33 percent strength aqueous solution of the dye having the formula

are brought to a pH of 12 with concentrated sodium hydroxide solution. After one hour, the solution is diluted with 1250 parts of water and brought to a pH of 2 with 2N hydrochloric acid. This precipitates the dye of the formula

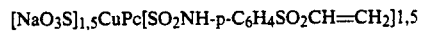

The dye is filtered off with suction and washed with saturated sodium chloride solution. After drying, 310 parts of the dye having a sulfate content of 0.05% are obtained. The chloride ion content can be reduced to the same value by electrodialysis of the aqueous solution at a pH of 6.

12) 107 parts of the dye of the formula

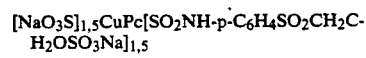

are stirred in an aqueous solution with 30 parts of coconut fatty amine until no more free amine can be detected in the reaction mixture by chromatography. The dye is then salted out and filtered off with suction. It is washed with saturated sodium chloride solution and dried at 80° C. This gives 86 parts of a dye which in the form of the free acid has the formula

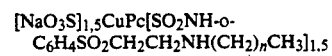

in which n denotes 8 to 18 (in accordance with the mixture of fatty amines present in coconut fatty amine).

13) Example 10 is repeated, except that 4 parts of the dye from Example 11 or 12 are used. This gives prints having high brilliance and very good light fastness and showing very good reproduction of the color cyan in multi-color printing.

14) 86 parts of a dye which in the form of the free acid corresponds to the formula (Id), in which X stands for the radical of the formula

are dissolved in 400 ml of water. The pH of the mixture is then brought to a value of 12 with concentrated sodium hydroxide solution. After 30 minutes, the solution is neutralized and the dye is isolated in a conventional manner. This gives 52 parts of a yellow dye which in the form of the free acid has the formula (Id), in which X stands for the radical of the formula $-CH=CH_2$.

15) 86 parts of a 40% strength dye which in the form of the free acid corresponds to the formula (Ie) defined above, in which X stands for $CH_2CH_2OSO_3H$ and has a dye content of 40%, are dissolved in 350 parts of water. The pH of the solution is adjusted to 12 with sodium hydroxide solution. 13.5 parts of tallow fatty amine (®Genamin TA 100 D) dissolved in 50 parts of glacial acetic acid are added, pH being maintained at 9.5 with sodium hydroxide solution. The mixture is then stirred for 30 minutes at 60° C., the dye is filtered off with suction and washed with sodium chloride solution and water. This gives 41 parts of an 84% strength yellow dye which in the form of the free acid has the formula (Ie), in which X stands for

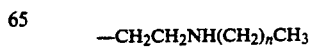

and n denotes 14 to 18.

This dye is particularly suitable for non-aqueous recording fluids.

16) Using other nucleophiles (see Table 4) below, instead of the tallow fatty amine, dyes which in the form of the free acid have the formula (Id), in which X has the particular meaning given in Table 4, are obtained analogously to Example 15:

TABLE 4

| Example | Nucleophile | X |
|---|---|---|
| 16a | Dimethylamine | $(CH_3)_2N-CH_2-CH_2-$ |
| 16b | n-Butylamine | $CH_3CH_2CH_2CH_2NHCH_2CH_2-$ |
| 16c | Ethylendiamine | $NH_2CH_2CH_2NHCH_2CH_2-$ |
| 16d | Ethanol | $CH_3CH_2OCH_2CH_2-$ |
| 16e | Benzyl alcohol | ⟨C₆H₅⟩—$CH_2OCH_2CH_2-$ |
| 16f | 2-Aminoethanol-sulfonic acid | $HO_3SCH_2CH_2NH-CH_2CH_2-$ |
| 16g | 2-Mercaptobenzothiazole | benzothiazole-$S-CH_2-CH_2-$ |

17) 133 parts of a dye which in the form of the free acid has the formula (If) defined above, in which X stands for the radical $-CH_2CH_2OSO_3H$ and which has a dye content of 31%, are dissolved in 300 parts of water. The mixture is subsequently stirred for 2 hours at a pH of 11.5. To isolate the product, the mixture is brought to a pH of 4 and 350 g of sodium chloride are added in small portions. Stirring is continued for another 3 hours, the dye is filtered off with suction and washed with saturated sodium chloride solution. After drying, 83 parts of the dye of the above formula, in which X stands for the radical $-CH=CH_2$ and has a content of 44%, are obtained.

18) 133 parts of the dye of the formula (If), in which X stands for $-CH_2CH_2OSO_3H$, are dissolved in 350 parts of water. The mixture is brought to a pH of 11.5 with sodium hydroxide solution and a mixture of 50 ml of glacial acetic acid and 9.5 parts of dodecylamine is added dropwise, the pH being maintained approximately constant with sodium hydroxide solution. The mixture is stirred for 12 hours at room temperature, neutralized with 2N hydrochloric acid, and 200 parts of sodium chloride are added. This gives 92 parts of a black dye having a dye content of 37% which in the form of the free acid has the formula (If), in which X stands for $-CH_2CH_2-NH(CH_2)_{11}CH_3$.

19) Using other nucleophiles (see Table 5) instead of dodecylamine, dyes, in which X has the meaning below (see table) are obtained analogously to Example 18.

TABLE 5

| Example | Nucleophile | X |
|---|---|---|
| 19a | Pentylamine | $CH_3(CH_2)_5NH-CH_2CH_2-$ |
| 19b | $C_{18}-C_{22}$-fatty amine | $CH_3(CH_2)_{18-22}NH-CH_2CH_2-$ |
| 19c | 2-Aminoethanol-sulfonic acid | $HO_3SCH_2CH_2NH-CH_2CH_2-$ |
| 19d | Propanol | $CH_3CH_2CH_2O-CH_2CH_2-$ |
| 19e | Methanol | $CH_3-O-CH_2CH_2-$ |
| 19f | ethylenediamine | $H_2NCH_2CH_2-NH-CH_2CH_2-$ |

TABLE 5-continued

| Example | Nucleophile | X |
|---|---|---|
| 19g | aniline | C₆H₅—$NH-CH_2CH_2-$ |
| 19h | 2-mercaptobenzimidazole | benzimidazole-$S-CH_2CH_2-$ |
| 19i | 2-mercaptobenzothiazole | benzothiazole-$S-CH_2-CH_2-$ |

20) Example 10 is repeated, except that 4 parts of the dye of Example 18 or 19b are used. This gives strong black prints having very good light fastness and high water-resistance.

We claim:

1. A method for the dyeing of a recording fluid using a water-soluble dye, consisting essentially of the step of dissolving in a liquid medium a water-soluble dye, wherein the dye in the form of the free acid has the formula (I)

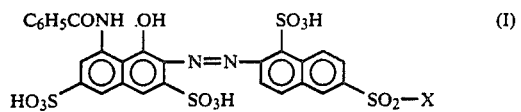

in which X stands for a radical of the formula $-CH_2CH_2OR^1$, in which $R^1$ denotes a cycloalkyl, aryl or aralkyl radical or a substituted or unsubstituted radical of an aliphatic or aromatic heterocyclic system and wherein the resulting recording fluid contains from 0.1% to 20% by weight of the dye of the formula (I), relative to the weight of the recording fluid.

2. A method as claimed in claim 1, wherein $R^1$ denotes a substituted or unsubstituted radical of an aliphatic or aromatic heterocyclic system.

3. A method as claimed in claim 1, wherein $R^1$ denotes a substituted radical of an aliphatic heterocyclic system.

4. A method as claimed in claim 1, wherein $R^1$ denotes an aryl or aralkyl radical.

5. A method as claimed in claim 3, wherein $R^1$ denotes the radical of a monosaccharide, disaccharide or trisaccharide.

6. A method as claimed in claim 4, wherein $R^1$ denotes the radical of phenol and of an alkylphenyl.

7. A recording fluid containing: A)0.1% to 20% by weight, relative to the weight of the recording fluid, of at least one of the dyes of the formula (I) as defined in claim 1

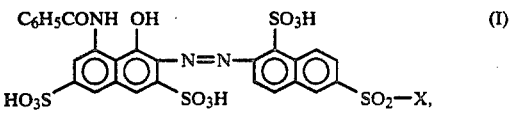

B)water, and C) slightly volatile water-soluble organic solvents.

8. The recording fluid as claimed in claim 7 containing less than 2% by weight of sulfate ions and less than 0.5% by weight of chloride ions, relative to the dye of the formula (I).

9. The recording fluid as claimed in claim 8 which contains 1-10% by weight of at least one of the dyes of formula (i), relative to the weight of the recording fluid.

10. The recording fluid as claimed in claim 7, wherein $R^1$ of said formula (I) denotes the radical of a monosaccharide, disaccharide, or trisaccharide.

11. The recording fluid as claimed in claim 7, wherein $R^1$ of said formula (I) denotes the radical of phenol and of an alkylphenyl.

12. The recording fluid as claimed in claim 8, wherein $R^1$ of said formula (I) denotes the radical of a monosaccharide, disaccharide, or trisaccharide.

13. The recording fluid as claimed in claim 8, wherein $R^1$ of said formula (I) denotes the radical of phenol and of an alkylphenyl.

* * * * *